United States Patent [19]
Ikegami et al.

[11] Patent Number: 5,990,581
[45] Date of Patent: Nov. 23, 1999

[54] METHOD AND SYSTEM FOR ALLOWING A POWER SUPPLY CIRCUIT TO USE A SMALL CURRENT SPECIFICATION SWITCH

[75] Inventors: Hiroyuki Ikegami; Toshiro Kawata, both of San Diego, Calif.

[73] Assignees: Sony Corporation of Japan, Tokyo, Japan; Sony Electronics, Inc., Park Ridge, N.J.

[21] Appl. No.: 09/127,703

[22] Filed: Jul. 31, 1998

[51] Int. Cl.$^6$ .................................................. H01H 47/00
[52] U.S. Cl. ............................ 307/131; 323/908; 363/49
[58] Field of Search ........................... 307/131; 323/908; 363/49

[56] References Cited

U.S. PATENT DOCUMENTS

| | | | |
|---|---|---|---|
| 5,124,630 | 6/1992 | Tsutsumi | 323/299 |
| 5,187,653 | 2/1993 | Lorenz | 363/89 |
| 5,287,262 | 2/1994 | Shilo | 363/143 |
| 5,394,063 | 2/1995 | Nakazawa | 315/159 |
| 5,420,780 | 5/1995 | Bernstein et al. | 363/89 |
| 5,574,632 | 11/1996 | Pansier | 363/49 |
| 5,619,127 | 4/1997 | Warizaya | 323/275 |

*Primary Examiner*—Jeffrey Gaffin
*Assistant Examiner*—Ed Garlepp
*Attorney, Agent, or Firm*—Wagner Murabito & Hao LLP

[57] ABSTRACT

A method and system for allowing a power supply circuit to limit inrush current and to use a small current specification switch. The power supply circuit comprises a transformer that receives a power signal from a primary circuit and supplies power of a selected voltage to a secondary circuit, to which a load is coupled. The primary circuit comprises a rectifier for providing a rectified power signal to the transformer, a power supply controller for controlling the transformer, and a small current specification switch coupled between a kick resistor and the power supply controller, where the kick resistor functions to activate the power supply controller when the circuit is first turned on. By coupling the switch between the kick resistor and the power supply controller, the present invention not only utilizes the high impedance kick resistor to limit inrush current through the switch so that the switch can have a small current specification, but also ensures that current to the power supply controller is cut off when the switch is open. Thus, when the load is powered off with the switch open, no wattage is dissipated by the power supply controller either and total power consumption of the circuit is thereby minimized. The primary circuit optionally comprises a voltage limiter coupled to protect the power supply controller. Additionally, the primary circuit optionally comprises an impedance element coupled to further limit inrush current.

16 Claims, 4 Drawing Sheets

METHOD AND SYSTEM FOR ALLOWING A POWER SUPPLY CIRCUIT TO USE A SMALL CURRENT SPECIFICATION SWITCH

BACKGROUND OF THE INVENTION

1. Field of the Invention

The present invention relates to the field of power supply circuits for electrical and electronic equipment.

2. Related Art

Most electrical and electronic appliances today provide a power switch allowing the user of the appliance to selectively turn the appliance on and off. When a power switch of an appliance is at its 'on' position, current flows through a completed circuit and a power supply unit supplies power to the appliance for its operation. Conversely, when a switch is at its 'off' position, power supply to the appliance is cut off and the appliance is effectively turned off. Depending on the design and application of a power supply circuit, different kinds of power switches with varying specifications are used.

Moreover, in a power supply circuit with an alternating current (AC) power input, a transformer is commonly used for voltage conversion. The power input is located in the primary circuit of the transformer and supplies the transformer with an input signal of a certain voltage. Depending on its specifications and settings, the transformer provides the secondary circuit with an output voltage that is proportional to, and higher (stepped up) or lower (stepped down) than, the input voltage in the primary circuit. Thus, by utilizing a transformer of proper specifications and settings, an output voltage suitable for the operation of an appliance coupled to the secondary circuit can be selected.

To implement power switching in a circuit as described above, a switch can be installed in the primary circuit to selectively supply and cut off the input AC voltage to the transformer, thereby controlling the output voltage and indirectly turning the appliance in the secondary circuit on and off. Alternatively, a switch can be installed in the secondary circuit to directly control current flow in the secondary circuit and thus switch the appliance on and off.

FIGS. 1A and 1B illustrate a common configuration of a power supply circuit 5 with an alternating current (AC) power input 10. In the primary circuit 6a of this prior art configuration 5, a switch 12 is coupled between the AC power input 10 and a power supply controller 15, which is in turn coupled to a transformer 17. The switch 12 can either be a double-cut switch 12, as illustrated in FIG. 1A, or a one-side switch 12, as illustrated in FIG. 1B. When the switch 12 is opened, the connection between the AC power input 10 and the power supply controller 15 is broken and thus the power supply controller 15 no longer drives the transformer 17 to provide power to the secondary output 18 in the secondary circuit 6b. Consequently, any load connected to the secondary output 18 is effectively turned off.

However, in this prior art configuration 5, a very large transient inrush current flows through the switch 12 when the switch 12 is closed initially. As an example, for a 17-inch cathode ray tube (CRT) display monitor with an AC power input of 240 volts, the magnitude of the inrush current can range from 30 amperes to 100 amperes when the switch 12 is first closed, with the actual magnitude of the inrush current dependent, in particular, on the input power and the total input circuit impedance. In order to withstand this enormous inrush current, the switch 12 in this prior art configuration 5 must meet strict mechanical and flammability requirements. As a result, the cost of the switch 12 is very high to meet these current requirements. It would be advantageous to reduce the cost of the power supply by reducing the electronic component costs.

Another disadvantage of this prior art circuit 5 that arises out of the strict mechanical and flammability requirements of the switch 12 is that the switch 12 inevitably has a larger size than one with less severe specifications. The larger switch 12 takes up much more room of the circuit board which houses the power supply circuitry than a smaller conventional switch. The higher space consumption means that the resulting circuitry is more cumbersome, and that the placement of other circuit components is less flexible. Moreover, in order to reduce the magnitude of the inrush current through the switch 12, additional circuit elements such as an impedance element 11 coupled between the AC power input 10 and the switch 12 has to be included to raise the total input impedance of the primary circuit 6a, thereby further increasing the cost and reducing the design flexibility of the power supply circuitry. In addition, the large inrush current through the switch 12 inevitably shortens the operational life of the switch 12. This is yet another disadvantage of the prior art circuit 5.

Furthermore, despite the presence of the impedance element 11 of FIGS. 1A and 1B for partially suppressing inrush current and the severe specifications of the switch 12 in this prior art circuit 5, a spontaneous inrush current sufficiently large to damage the switch 12 can still be generated occasionally when the switch 12 is closed. As such, yet another disadvantage of this prior art circuit 5 is that the reliability of the switch 12 and the power supply circuit 5 as a whole is lower than desirable.

FIG. 2 illustrates another prior art circuit 7 whereby a tactile switch 22 is located in the secondary circuit 8b to which the load is also coupled. A tactile switch 22 is operated by light touch or gentle pressing and is commonly used in electronic appliances such as home audio and video equipment. Unlike a toggle switch which physically make or break the circuit by means of a moving contact, a tactile switch 22 usually operates in conjunction with a micro-controller to implement power switching. As is well known in the art, the micro-controller detects pressing action on the tactile switch 22 and turns on or shuts down the secondary circuit 8b by controlling the power supply circuit 7 via a feedback signal.

By using a tactile switch 22 in the secondary circuit 8b to which the load is coupled, instead of having a switch in the primary circuit 8a, this prior art circuit 7 effectively turns off the load by entering a 'standby mode', in which power is no longer being consumed in the secondary circuit 8b, while circumventing the requirement of a switch with severe specifications to withstand a large inrush current in the primary circuit 8a. Nevertheless, the power supply circuit 7 is still consuming power because the AC power input 20 is not disconnected from the power supply controller 25 in the primary circuit 8a by operation of the tactile switch 22 in the secondary circuit 8b. Recently, however, an increasing number of consumer electronics applications require a power supply circuit which can achieve "zero watt" or "near zero watt" power consumption when the load is turned off. This prior art circuit 7 does not meet this minimal power consumption requirement because the primary circuit 8a remains on and continues to consume power through the circuit elements, in particular the power supply controller 25, when the circuit 7 is in standby mode. It is advantageous to supply a low cost power supply that also meets the "zero watt" or "near zero watt" power consumption requirement.

To summarize, there is a need for a power supply circuit which does not require a high current switch. Additionally, there is a need for a power supply circuit that does not consume excessive power when the load is turned off. In one prior art circuit 5, as illustrated in FIGS. 1A and 1B, a large inrush current dictates that the switch 12 be of severe specifications. As is explained above, these stringent requirements of the switch 12 necessarily compromises the space and cost considerations of the prior art circuit 5. Further, the reliability of the circuit 5 is still unsatisfactory because of the potentially damaging effect of a large inrush current on the switch 12 despite such countermeasures as increasing input impedance and using a severe specification switch 12. In another prior art circuit 7, as illustrated by FIG. 2, the tactile switch 22 can power down the secondary circuit 8b but not the primary circuit 8a. Unfortunately, this means that power consumption through the power supply controller 25 and other circuit elements in the primary circuit 8a continues even when the secondary circuit 8b is turned off. Thus, these two prior art circuits 5 and 7 fail to address the full set of needs that are required of a power supply circuit for use in modern electrical and electronic appliances.

SUMMARY OF THE INVENTION

Accordingly, the present invention provides a system and method for a power supply circuit that utilizes an inexpensive, compact size, small current specification switch which is also highly reliable. The present invention further provides a power supply system that not only turns off the load but also cuts off current flow to the power supply controller when the switch is open, thereby minimizing total power consumption of the circuit at power off. These and other advantages of the present invention not specifically mentioned above will become clear within discussions of the present invention presented herein.

A method and system are described herein for allowing a power supply circuit to use a small current specification switch. Within the power supply circuit, a transformer receives a power signal from a primary circuit and supplies power of a selected voltage to a secondary circuit. A load that is to be powered by the power supply circuit is coupled to the secondary circuit and receives power from the secondary output of the transformer. In the primary circuit, a rectifier generates a rectified power signal and supplies it to the transformer for voltage conversion, and a power supply controller controls and regulates the transformer. A small current specification switch is utilized to turn on and off the power supply circuit and a kick resistor is used to activate the power supply controller when the circuit is first turned on. By coupling the switch between the kick resistor and the power supply controller, the present invention not only utilizes the high impedance kick resistor to limit the inrush current through the switch so that the switch can have a small current specification, but also ensures that current to the power supply controller is cut off when the switch is open. Thus, when the power supply circuit is turned off, no power is dissipated by the power supply controller and total power consumption of the circuit is minimized. Additionally, the primary circuit optionally comprises a voltage limiter for protecting the power supply controller and an impedance element for further limiting inrush current through the switch.

More specifically, embodiments of the present invention include a power supply circuit having a primary circuit comprising power input lines for receiving an input power signal, a rectifier circuit coupled to receive the input power signal and for generating a rectified power signal, and a power supply controller circuit for controlling a transformer. The transformer is coupled to receive the rectified power signal in the primary circuit and for generating a secondary output for providing power to a load coupled to a secondary circuit. The primary circuit further comprises a kick resistor coupled to receive the input power signal and for activating the power supply controller circuit when the power supply circuit is first turned on and also for limiting the inrush current through a small current specification switch. The small current specification switch is coupled between the kick resistor and the power supply controller circuit for selectively coupling and decoupling the kick resistor and the power supply controller circuit.

Embodiments of the present invention include the above and wherein the power supply controller circuit receives no current and dissipates no wattage when the small current specification switch decouples the kick resistor from the power supply controller circuit.

DETAILED DESCRIPTION OF THE INVENTION

In the following detailed description of the present invention, a method and system for allowing a power supply circuit to use a small current specification switch, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 3:
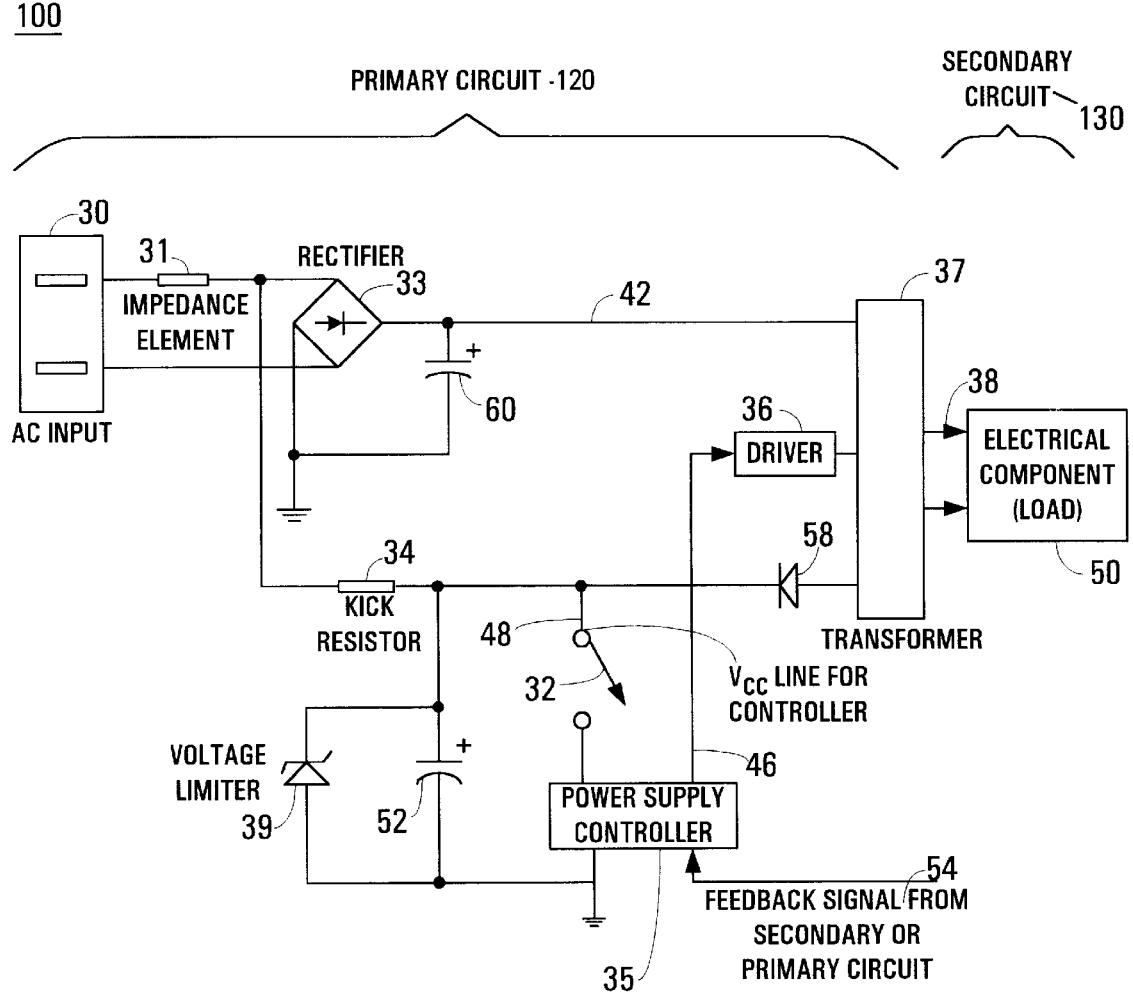
FIG. 3 illustrates an embodiment of the power supply circuit in accordance with the present invention, where a small current specification switch is used in the primary circuit and the inrush current through the switch is small.

FIG. 3 illustrates a power supply circuit 100 having a small current specification switch 32 in accordance with the present invention. As illustrated in FIG. 3, a transformer 37 is used for voltage conversion in this exemplary implementation. As will be clear to one skilled in the art, any type of transformer, such as the flyback type, the resonance type and the forward type, can be used as transformer 37. Moreover, the specifications of the transformer 37, such as the number of windings and the range of operational voltages, can vary within the present invention depending on the application for which the power supply circuit 100 is used. The transformer 37 also demarcates the boundary between a primary circuit 120 and a secondary circuit 130 of the power supply circuit 100. Power input lines 30 are coupled to the primary circuit 120 and are for receiving an input power signal from an external power source. Typically, an alternating current (AC) from a regular electric wall socket or its equivalent is used as the input power signal (e.g., 110 V AC, 60 Hz). As described in more detail below, the input power signal is received by a rectifier circuit 33 and, via a kick resistor 34, by a power supply controller 35.

As illustrated in FIG. 3, the rectifier circuit 33 receives the input power signal and generates a rectified power signal over line 42. In other words, the rectifier circuit 33 takes an alternating current (AC) that reverses polarities periodically and converts it into a direct current (DC) whose polarity remains unchanged over time. A capacitor 60 is coupled across the rectifier circuit 33 to smooth out periodic variations in voltage (ripples) in the DC generated by the rectifier circuit 33. The rectifier circuit 33 is coupled to the transformer 37 and the rectified power signal produced by the rectifier circuit 33 is supplied to the transformer 37 as an input over line 42. As described above, the transformer 37 performs voltage conversion using the rectified power signal and provides a secondary output 38 of suitable voltage to power the secondary circuit 130. A load 80, e.g., an appliance or equipment that is powered by the power supply circuit 100, is coupled to receive the secondary output 38 for the operation of the load 80. Therefore, the load 80 can be selectively turned on and off by controlling the transformer 37 which supplies the secondary output 38 to the secondary circuit 130.

In the primary circuit 120, the power supply controller 35 is coupled to receive the input power signal via the kick resistor 34 and is for controlling the transformer 37. In particular, when the power supply controller 35 is powered off, the transformer 37 is likewise turned off. As a result, the transformer 37 does not deliver power to the secondary circuit 130 and the load 80 is effectively turned off. It is well known to one skilled in the art that a variety of power supply controllers can be used within the present invention. Some examples of power supply controllers that are suitable in the instant application are: resonance type controllers; RCC type controllers; and PWM type controllers. In one embodiment of the present invention, a transistor based driver 36 is coupled between the power supply controller 35 and the transformer 37 via control line 46. The power supply controller 35 controls the transformer 37 via the driver 36 to supply power at the secondary output 38. The power supply controller 35 is also coupled to receive a feedback signal 54 from the secondary circuit 130 or the primary circuit 120.

Coupled to the power supply controller 35 of FIG. 3 is the kick resistor 34, which has a high impedance value. Depending on the application of the power supply circuit 100, the impedance value of the kick resistor 34 typically ranges from 30 kilo-ohms to 70 kilo-ohms. One function of the kick resistor 34 is to activate the power supply controller 35 when the power supply circuit 100 is turned on initially by allowing the input power signal to be supplied to the power supply controller 35 over the $V_{cc}$ line 48 when the switch 32 is first closed. A diode 58 is coupled between the transformer 37 and the power supply controller 35. Once the circuit 100 is powered up, the transformer 37 provides power to the power supply controller 35 via the diode 58 over the $V_{cc}$ line 48. Importantly, in the present invention, a small current specification switch 32 is coupled between the kick resistor 34 and the power supply controller 35.

Figure 1A:
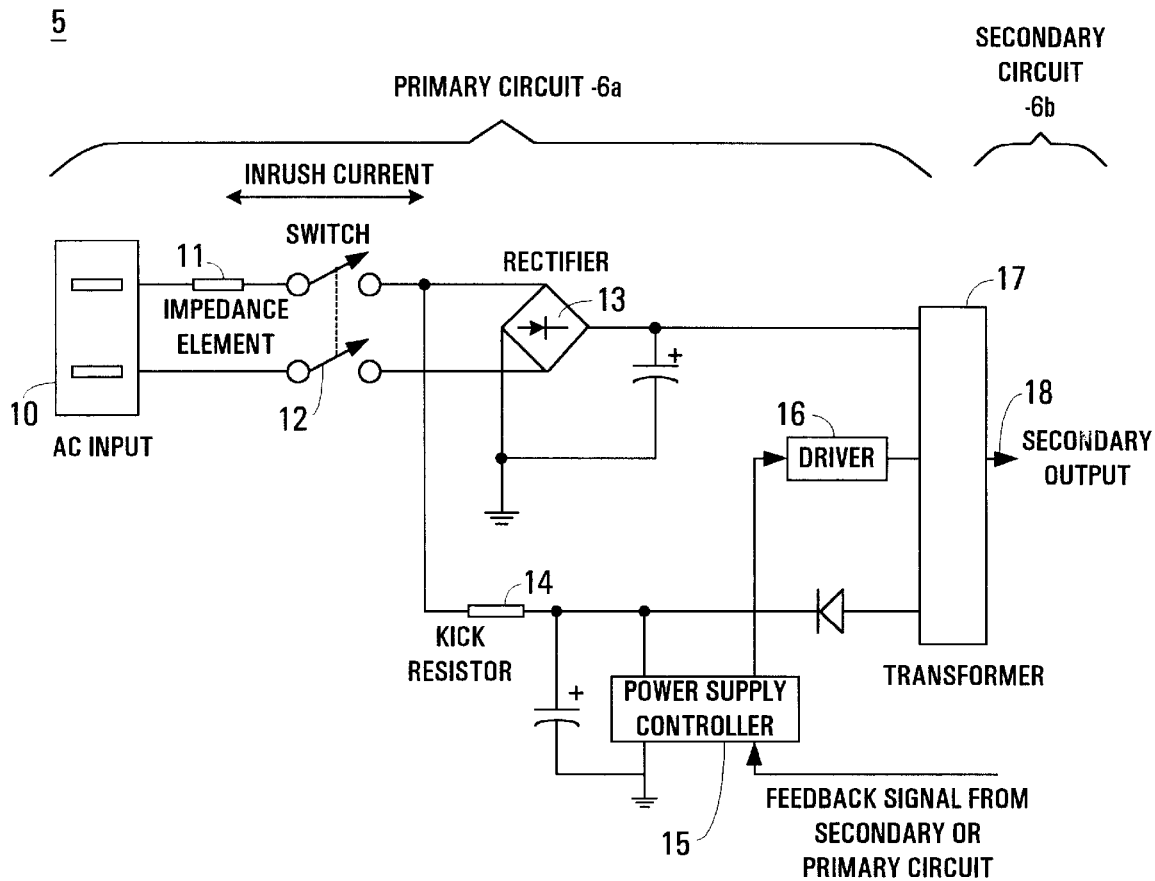
FIGS. 1A and 1B illustrate a prior art power supply circuit where a switch with severe specifications is used in the primary circuit to withstand the large inrush current that is generated when the switch is first closed.
Figure 1B:
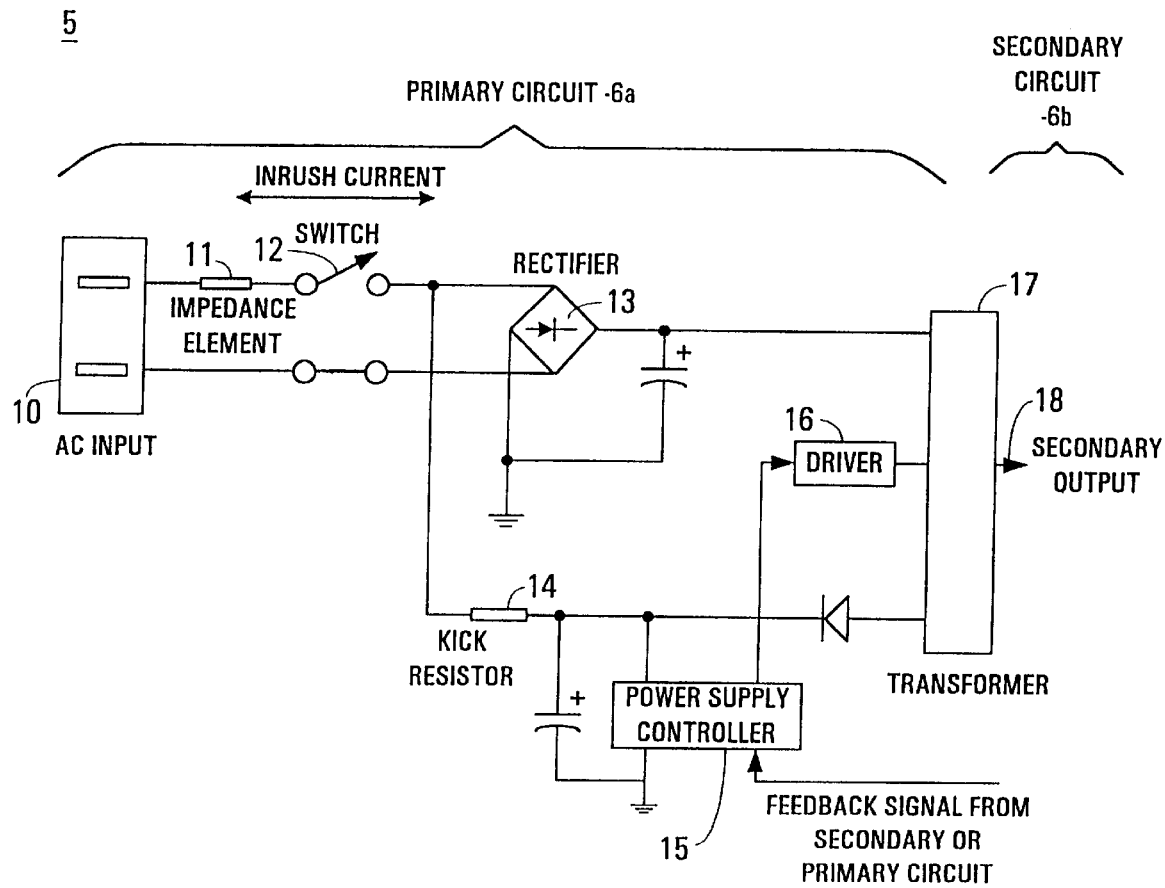

It is appreciated that by virtue of the placement of the switch 32 between the kick resistor 34 and the power supply controller 35, the large impedance value of the kick resistor 35 significantly reduces the magnitude of any inrush current through the switch 32 upon closing the switch 32. As an example, with a kick resistor 34 having a 30 kilo-ohm impedance, an AC power input 30 of 240 volts and a 17-inch cathode ray tube (CRT) display monitor as the load 80, the inrush current is approximately 11.3 milliamperes when the switch 32 is first closed. This is a drastically smaller inrush current than that in the prior art circuit 5 as depicted in FIGS. 1A and 1B and described above, which has a value between 30 amperes and 100 amperes with comparable circuit components. Therefore, while unsuitable for the prior art circuit, a small current specification switch 32 can advantageously be used in the present invention.

Thus, by coupling the switch 32 between the kick resistor 34 and the power supply controller 35, the present invention achieves an order of magnitude reduction in the inrush current through the switch 32 when compared to the prior art circuit 5 as discussed with respect to FIGS. 1A and 1B. Hence, an inexpensive small current specification switch 32 of compact size, instead of a large switch 12 with severe specifications as in the prior art circuit 5, can be safely utilized in the present invention. Consequently, a significant saving both in terms of space consumption on the design board and the cost of the switch 32 is realized by the present invention. Additionally, the reliability of the switch 32 within the present invention is also greatly improved over the prior art. This is because the small inrush current ensured by the present invention is very unlikely to adversely affect the switch 32, whereas the much larger inrush current in the prior art circuit 5 can still potentially damage the prior art switch 12 despite its severe specifications. Moreover, it is well known in the art that the switch 32 within the present invention can be one of several types of switches. In one embodiment, a toggle switch 32 operable directly by a person is used.

Figure 2:
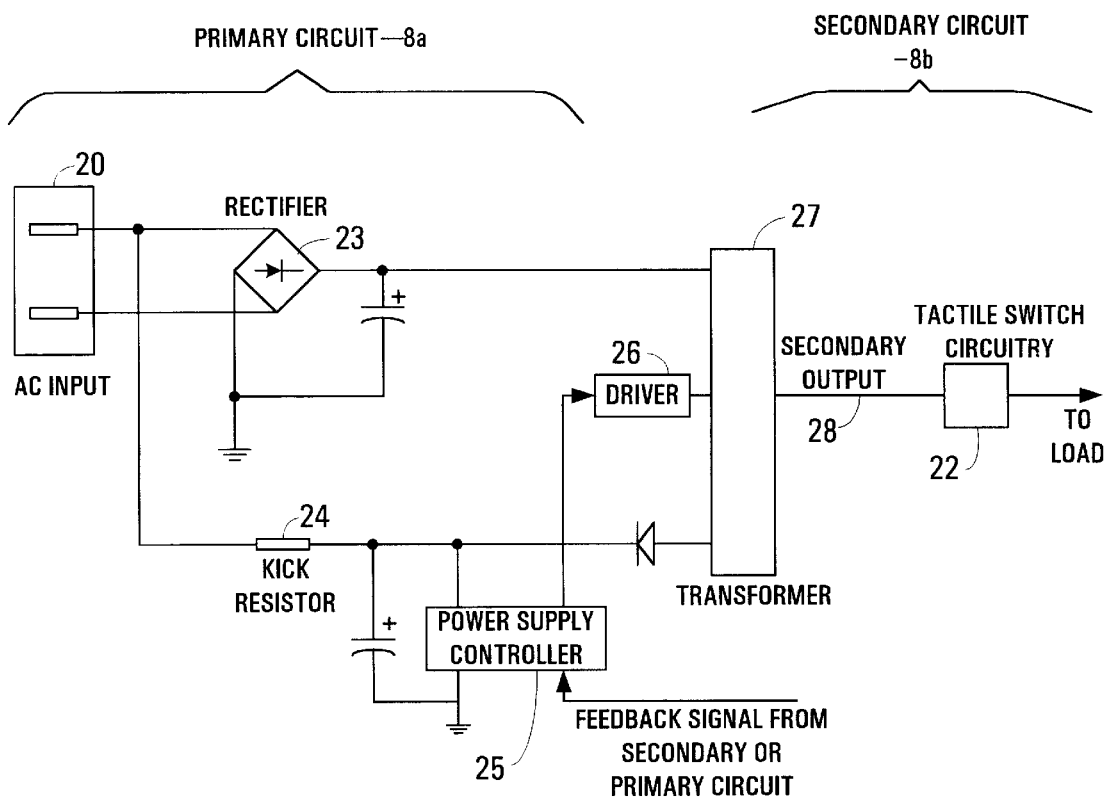
FIG. 2 illustrates another prior art power supply circuit where a tactile switch is used in the secondary circuit for power switching but power is consumed when the switch is in the off state.

Furthermore, it is appreciated that by coupling the switch 32 between the kick resistor 34 and the power supply controller 35, on the $V_{cc}$ line 48 of the controller 35 as illustrated in FIG. 3, current flow to the power supply controller 35 is cut off when the switch 32 is open (in the off position), so that the power supply controller 35 does not dissipate any power when the power supply circuit 100 is turned off. Thus, by shutting off the power supply controller 35 completely, the present invention power supply circuit 100 minimizes total power consumption and achieves a near "zero watt" state at power off. This solves a problem not addressed by the prior art circuit 7 using a tactile switch 22 as illustrated in FIG. 2 and described in detail above. More specifically, while the prior art circuit 7 purports to implement power switching using a tactile switch 22, the prior art circuit 7 in effect only enters a standby mode when the tactile switch 22 is turned off because current still flows through the power supply controller 25 and so the controller 25 continues to dissipate power. In contrast, the present invention ensures that the power supply controller 35 no longer consumes power when the switch 32 is open by cutting off the $V_{cc}$ line 48 of the controller 35. The instant improvement is especially desirable for today's consumer electronics market.

To further improve the reliability of the power supply circuit 100, one embodiment of the present invention comprises a voltage limiter 39 coupled between the power supply controller 35 and the kick resistor 34 in FIG. 3. The voltage limiter 39 functions to protect the power supply controller 35 by limiting the maximum voltage across the controller 35, especially when the switch 32 is closed initially and the capacitor 52, which is coupled across the power supply controller 35 via the switch 32, tends to draw a large current through the controller 35.

Additionally, in one embodiment of the present invention, an impedance element 31 is coupled to the input power lines 30. The impedance element 31 serves to increase the input impedance of the circuit 100 and thereby further suppresses the inrush current through the switch 32 and also protects the rectifier 33. It is appreciated that within the scope of the present invention, the impedance value of the impedance element 31 is smaller than that of the corresponding impedance element 11 of the prior art circuit 5 as illustrated in FIGS. 1A and 1B. This is because in the present invention, the switch 32 is primarily protected by the kick resistor 34 from a large inrush current and the impedance element 31 optionally provides additional protection for the switch 32. While the rectifier 33 is also protected by the impedance element 31, the rectifier 33 is not as delicate as the switch 32 and thus a smaller impedance value for the impedance element 31 suffices. Typically, the value of the impedance element 31 is approximately 1 ohm. In contrast, in the prior art circuit 5 illustrated in FIGS. 1A and 1B, the impedance element 11 is essential to protect the switch 12 from a large inrush current, so that the impedance value has to be substantially larger, resulting in a higher cost.

As described above, the present invention provides a mechanism and method for using a small current specification switch 32 in a power supply circuit 100 by significantly reducing the inrush current through the switch 32 when the switch 32 is closed initially. The present invention does not require specialized circuit components but appreciates the need to minimize the magnitude of the inrush current through the switch 32 and fulfills this need by a novel placement of the various circuit elements. Consequently, an inexpensive, compact size switch 32 with small current specification can be used within the present invention power supply circuit 100 without the higher cost and space requirements of a severe specification switch 12 as is used in the prior art circuit 5. Moreover, minimal power consumption is achieved as well within the present invention because the power supply controller 35 does not receive any current when the switch 32 is open and thus does not dissipate any power. The instant novel improvement thus eliminates the limitation presented by the prior art circuit 7 using a tactile switch 22 located in the secondary circuit 8b. Further, reliability of the switch 32 itself and of the power supply circuit 100 of the present invention as a whole is greatly enhanced since the inrush current through the switch 32 is effectively suppressed to a safe level by virtue of the relative location of the large impedance kick resistor 34 and the switch 32.

The preferred embodiment of the present invention, a method and system for allowing a power supply circuit to use a small current specification switch, is thus described. While the present invention has been described in particular embodiments, it should be appreciated that the present invention should not be construed as limited by such embodiments, but rather construed according to the below claims.

What is claimed is:

1. A power supply circuit comprising:
   power input lines for receiving an input power signal;
   a rectifier circuit coupled to receive said input power signal and for generating a rectified power signal;
   a power supply controller circuit coupled to receive said input power signal via a kick resistor and a small current specification switch and for controlling a transformer;
   said transformer coupled to receive said rectified power signal and for generating a secondary output for providing power to a load;
   said kick resistor coupled to receive said input power signal and for activating said power supply controller circuit and for limiting inrush current through said small current specification switch;
   wherein said small current specification switch is coupled between said kick resistor and said power supply controller circuit for selectively coupling and decoupling said kick resistor and said power supply controller circuit; and
   wherein said power supply controller circuit receives no current and dissipates no wattage when said small current specification switch decouples said kick resistor from said power supply controller circuit.

2. A circuit as described in claim 1 further comprising an impedance element coupled between said power input lines and said rectifier circuit for further limiting inrush current through said small current specification switch.

3. A circuit as described in claim 1 further comprising a voltage limiting circuit coupled between said power supply controller circuit and said kick resistor for protecting said power supply controller circuit.

4. A circuit as described in claim 1 wherein said kick resistor has a resistance substantially between 30 and 70 kilo-ohms.

5. A circuit as described in claim 2 wherein said impedance element has an impedance substantially between 1 and 1.5 ohms.

6. A power supply circuit comprising:
   power input lines for receiving an alternating current input power signal;
   a rectifier circuit coupled to receive said input power signal and for generating a rectified power signal;
   a power supply controller circuit coupled to receive said input power signal via a kick resistor and a small current specification switch and for controlling a transformer;
   said transformer coupled to receive said rectified power signal and for generating a secondary output for providing direct current power to a load;
   said kick resistor coupled to receive said input power signal and for activating said power supply controller circuit and for limiting inrush current through said small current specification switch;
   wherein said small current specification switch is coupled between said kick resistor and said power supply controller circuit for selectively coupling and decoupling said kick resistor and said power supply controller circuit; and
   wherein said power supply controller circuit receives no current and dissipates no wattage when said small current specification switch is turned off.

7. A circuit as described in claim 6 further comprising an impedance element coupled between said power input lines and said rectifier circuit for further limiting inrush current through said switch.

8. A circuit as described in claim 6 further comprising a voltage limiting circuit coupled between said power supply controller circuit and said kick resistor for protecting said power supply controller circuit.

9. A circuit as described in claim 6 wherein said kick resistor has a resistance substantially between 30 and 70 kilo-ohms.

10. A circuit as described in claim 7 wherein said impedance element has an impedance substantially between 1 and 1.5 ohms.

11. A method for providing power to a load, said method comprising the steps of:
   a) receiving an input power signal and generating a rectified power signal therefrom;
   b) applying said rectified power signal to a transformer wherein said transformer generates a secondary output for powering a load;

c) controlling said transformer with a control circuit;

d) supplying said control circuit with a power signal originating from said transformer after said control circuit has been activated;

e) activating said control circuit with a kick resistor coupled between said input power signal and said control circuit; and f) selectively supplying power to and cutting power off from said control circuit with a small current specification switch coupled between said kick resistor and said control circuit, wherein said control circuit consumes no power when said switch is turned off.

12. A method as described in claim 11 comprising the additional step of further limiting inrush current through said switch with an impedance element.

13. A method as described in claim 11 further comprising the step of protecting said control circuit with a voltage limiting circuit.

14. A method as described in claim 11 wherein said kick resistor has an impedance substantially between 30 and 70 kilo-ohms.

15. A method as described in claim 12 wherein said impedance element has an impedance substantially between 1 and 1.5 ohms.

16. A method as described in claim 11 further comprising the step of eliminating current flow and power consumption through said control circuit when said switch decouples said kick resistor from said control circuit.

* * * * *